(12) United States Patent
Thompson

(10) Patent No.: US 12,160,425 B2
(45) Date of Patent: *Dec. 3, 2024

(54) INTEGRATED BOT AND CAPTCHA TECHNIQUES

(71) Applicant: A10 Networks, Incorporated, San Jose, CA (US)

(72) Inventor: Micheal Thompson, Meridian, ID (US)

(73) Assignee: A10 Networks, Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,176

(22) Filed: Jun. 1, 2021

(65) Prior Publication Data

US 2022/0124094 A1 Apr. 21, 2022

Related U.S. Application Data

(63) Continuation of application No. 14/706,963, filed on May 8, 2015, now Pat. No. 11,025,625.

(51) Int. Cl.
*H04L 9/40* (2022.01)
*G06F 21/44* (2013.01)

(52) U.S. Cl.
CPC .............. *H04L 63/10* (2013.01); *G06F 21/44* (2013.01); *G06F 2221/2133* (2013.01); *H04L 2463/144* (2013.01)

(58) Field of Classification Search
CPC ... H04L 63/10; H04L 2463/144; G06F 21/44; G06F 2221/2133

USPC .............................................................. 726/1
See application file for complete search history.

(56) References Cited

U.S. PATENT DOCUMENTS

| | | | |
|---|---|---|---|
| 7,899,867 B1 * | 3/2011 | Sherstinsky | H04L 51/04 726/1 |
| 8,112,483 B1 * | 2/2012 | Emigh | G06F 21/36 713/182 |
| 8,489,399 B2 | 7/2013 | Gross | |
| 8,838,570 B1 | 9/2014 | English | |
| 9,055,557 B1 | 6/2015 | Bayar et al. | |
| 9,723,005 B1 * | 8/2017 | McInerny | G06F 21/604 |
| 9,942,214 B1 * | 4/2018 | Burciu | H04L 63/08 |
| 10,438,225 B1 * | 10/2019 | Reading | G06Q 30/0225 |
| 10,701,179 B2 * | 6/2020 | Wang | H04L 41/5006 |
| 2007/0143624 A1 | 6/2007 | Steeves | |
| 2008/0086522 A1 | 4/2008 | Biggs | |
| 2011/0029781 A1 * | 2/2011 | Clark | H04L 63/08 713/182 |
| 2012/0246737 A1 * | 9/2012 | Paxton | G06F 16/24578 726/27 |
| 2012/0254971 A1 * | 10/2012 | Hu | G06F 21/36 726/9 |
| 2014/0020067 A1 * | 1/2014 | Kim | H04L 63/0861 726/4 |
| 2014/0047543 A1 | 2/2014 | Kim et al. | |
| 2015/0365401 A1 | 12/2015 | Brown et al. | |

(Continued)

*Primary Examiner* — Dant B Shaifer Harriman

(57) ABSTRACT

Integrated techniques for computer bot detection and human user based access include determining if a client device has been identified as a computer bot based upon client information extracted from a service request and a service policy. The service policy is also utilized to determine if the client device is operating under control of a human user or operating autonomously based upon matching a captcha response to an expected captcha response.

17 Claims, 5 Drawing Sheets

(56) References Cited

U.S. PATENT DOCUMENTS

| | | | |
|---|---|---|---|
| 2016/0277429 A1* | 9/2016 | Demirjian | G06F 21/36 |
| 2016/0328551 A1 | 11/2016 | Thomspson | |
| 2016/0330235 A1 | 11/2016 | Thompson | |
| 2016/0381080 A1* | 12/2016 | Reddem | H04L 63/205 |
| | | | 726/1 |
| 2017/0078319 A1 | 3/2017 | Thompson | |
| 2018/0069847 A1* | 3/2018 | Potnuru | H04L 63/08 |
| 2019/0132419 A1* | 5/2019 | Wang | G06F 9/4881 |

* cited by examiner

INTEGRATED BOT AND CAPTCHA TECHNIQUES

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing systems is the provisioning of network resources, such websites, web services, cloud services, content and the like, that offer information and services.

A number of network resources are intended for use by computing devices under direct control of a user and are not intended for access by automated computing devices. When computing devices access resources in response to inputs received from human users through input and/or output interfaces such as keyboard, mouse, brail reader, microphone, display, touch screen display, and/or the like, the accesses are referred to herein after as human user controlled access. In contrast, accesses to network resources and services may be under automated control by a computing device, herein after referred to as automated access.

Automated access by computing device can be problematic. In one scenario, a website subscribes to a web hosting service with limited bandwidth to accommodate an expected number of users. In such a scenario, one or more automated computing devices can access the website at a much higher rate than computing devices acting under direct control of the expected number of users, thereby exceeding the limited bandwidth allotted by the web hosting service. In another scenario, a web service pays for information that it in turn provides to users. The more users that utilize the web service, the more the web service has to pay to obtain the information. In yet another scenario, a website has a distribution rights agreement with a content owner regarding the content the website offers. The agreement covers an expected number of users. In such scenarios, when an automated computing device such as a web-bot, computer program, script or the like, automatically accesses the websites or web services, the usage may exceed the net bandwidth, the content rights and or the like, disrupting access by other users, increasing costs to the web service provider, and/or the like. Therefore, it is important for network resources and services to determine if access thereto is by computing device acting under direct control by a user or is under automated control.

A common technique to detect access by a human user is to utilize a Completely Automated Public Turing test to tell Computers and Humans Apart (CAPTCHA or captcha). A typical captcha technique includes an image, often a distorted image of a series of alpha numeric characters, readily recognizable by human users, but difficult to be recognized by a computing device acting in an automated state. A correct response to a captcha is therefore an indication that the access is under direction by a human user. However, as computing technologies advance, there are better and better computing software, such as Optical Character Recognition (OCR), pattern recognition, artificial intelligence or the like, that are more and more capable in recognizing captchas. A correct response to a conventional captcha may no longer be a good benchmark to tell computers and humans apart. One way to solve the problem is to use more complex captchas. However, more complex captchas may not be readily recognizable by many human users, and are thus not useful. Accordingly, there is a continued need for improved techniques for distinguishing between computing devices operating under control of human users and automated access by computing devices.

SUMMARY OF THE INVENTION

The present technology may best be understood by referring to the following description and accompanying drawings that are used to illustrate embodiments of the present technology directed toward integrated computer robot detection and captcha techniques.

In one embodiment, a method of robot computer detection and determining if a client device is operating under control of a human user begins with receiving a service request from the client device. Client information is extracted from the service request and used to determine if the client device has been identified as a computer bot based upon a service policy and a bot database. If the client device is not a known computer bot, a captcha is selected in response to the service request. Captcha instructions and expected captcha response are then generated for the selected captcha. The expected captcha response may also include expected tinting information. The captcha instruction are sent to the client device for processing thereby, in response to the captcha instruction, a captcha response from the client device may be received. The captcha response is compared to the expected response to determine based on the service policy if the client device is operating under control of a human user or operating autonomously.

This Summary is provided to introduce a selection of concepts in a simplified form that are further described below in the Detailed Description. This Summary is not intended to identify key features or essential features of the claimed subject matter, n is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
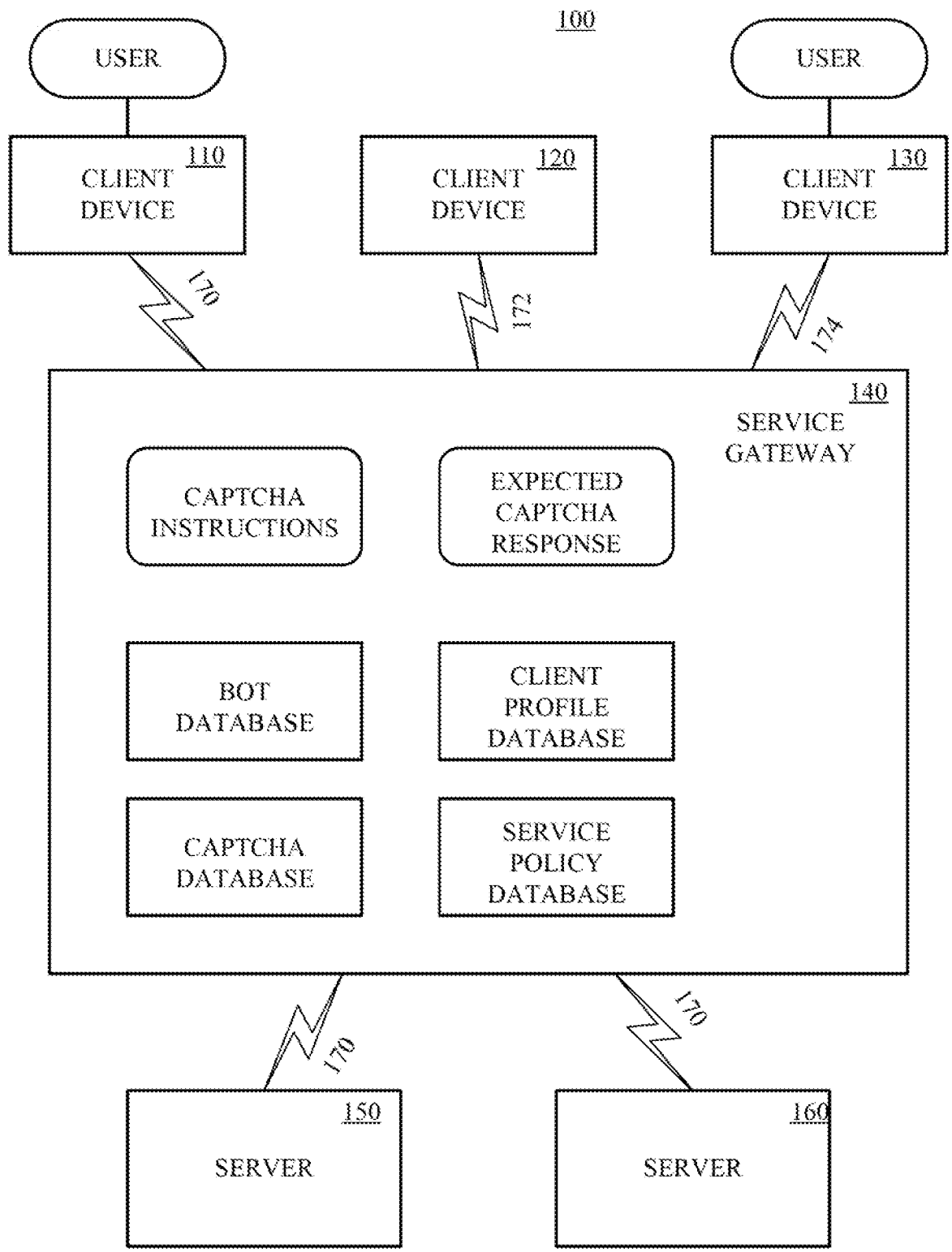
FIG. 1 shows an exemplary computing environment for implementing embodiments of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

FIG. 1 shows an exemplary computing environment for implementing embodiments of the present technology. The computing environment 100 includes one or more client devices 110-130, a service gateway 140, one or more server devices 150, 160, and one or more networks 170-178. The one or more client devices 110-130 are communicatively coupled to the one or more server devices 150, 160 through the service gateway 140 by the one or more networks 170-178. The server devices 150, 160 offer resources (e.g., information and/or hardware) and/or services to the client devices 110-130.

The client devices 110-130 may include a personal computer, a laptop computer, a tablet, a smartphone, a mobile phone, an Internet phone, a netbook, a home gateway, a broadband gateway, a network appliance, a set top box, a media server, a personal media play, a personal digital assistant, a personal, game console or the like. The service gateway 140 may include a server load balancer (SLB), a firewall, a network security device, an application delivery controller (ADC), a traffic manager, a network switch, a router, a service gateway, a network blade of a server, or a server. The servers 150, 160 may be any computing device to service requests by the client devices. The networks 170-18 may include an Ethernet network, an ATM network, a cellular network, a wireless network, a Frame Relay network, an optical network, an IP network or any data communication network utilizing other physical layer, link layer capability or network layer to carry data packets.

Although the exemplary computing environment is shown with a discrete service gateway 140, it is appreciated that the service gate way may be integrated into a number of other devices of the exemplary computing environment. For example, the service gateway may be integral to a server device, a firewall, a network security device, a traffic manager, or the like.

Figure 2:
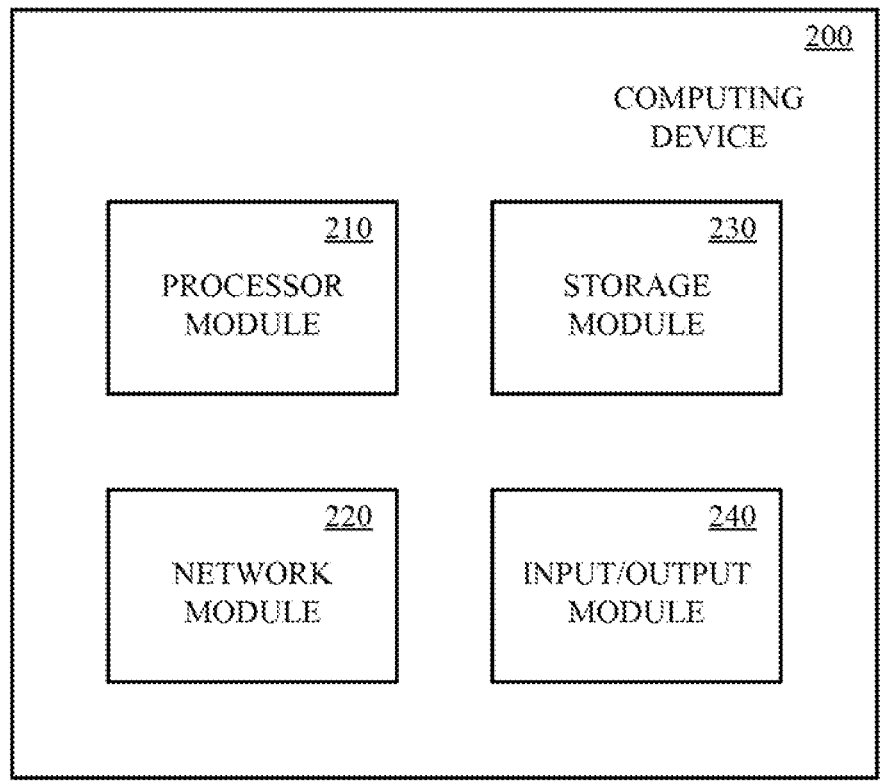
FIG. 2 shows an exemplary computing device for implementing the client devices, the service gateway, and/or the server devices, in accordance with embodiment of the present technology.

Referring now to FIG. 2, an exemplary computing device for implementing the client devices 110-130, the service gateway 140 and/or the server devices 150, 160, is shown. The computing device 200 may include a processor module 210, network module 220, a computing storage module 230, one or more input/output interface modules 240, and the like. The processor module 210 may include one or more processors which may include a micro-processor, an Intel processor, an AMD processor, a MIPS processor, an ARM-based processor, a RISC processor, a micro-controller, a signal processor, a network processor, an application processor, a media processor, a micro-processor, an embedded processor in a circuitry, a Field Programmable Gate Array (FPGA), an Application Specific integrated Circuit (ASIC), and/or Digital Signal Processor (DSP). In one implementation, the processor module 210 includes one or more processor cores embedded in a processor. The network module 220 may include one or more network interfaces such as an Ethernet interface, optical network interface, a wireless network interface, T1/T3 interface, a WAN interface, and/or LAN interface. In one implementation, the network module 220 includes a network processor. The storage module 230 may include one or more type of computer memory such as RAM, DRAM, SRAM, SDRAM, a hard disk drive, a solid state drive, an external disk, a DVD, a CD, or a readable external disk utilized by processor module or network interface module. Storage module 230 stores one or more computer programming instructions which when executed by processor module 210 implement one or more of the functionality of this present technology. The input/output (I/O) module 240 may include or connect to keyboard, a keypad, a mouse, a gesture based input sensor, a touch based input sensor, an image based input sensor, a microphone, a physical or sensory input peripheral, a display, a speaker, or a physical or sensual output peripheral.

Referring again to FIG. 1, some resources and/or services provided by the server devices 150, 160 may be intended for human users (e.g., human user controlled access) and are not designed for machine to machine usage (e.g., automated access). For example, streaming multimedia content, a querying a database, or the like provided by server 150 may be intended for access by client devices 110 and 130 acting under control of a human user 180, 182. However, access to the streaming multimedia content, the database, or the like may not be intended for automated access by client device 120 not wider control of a human user.

For example, web scraping and other similar techniques utilize a "bot" client device to extract data from web pages.

These types of automated access by client devices may consume excessive server resources, violate the terms of use of websites (e.g., digital rights management agreements), infringe on intellectual property rights (e.g., copyrights) of websites, or the like. Accordingly, the service gateway in accordance with embodiments of the present technology can determine whether a client device is operating autonomously and control access to server resources if appropriate.

Figure 3A:
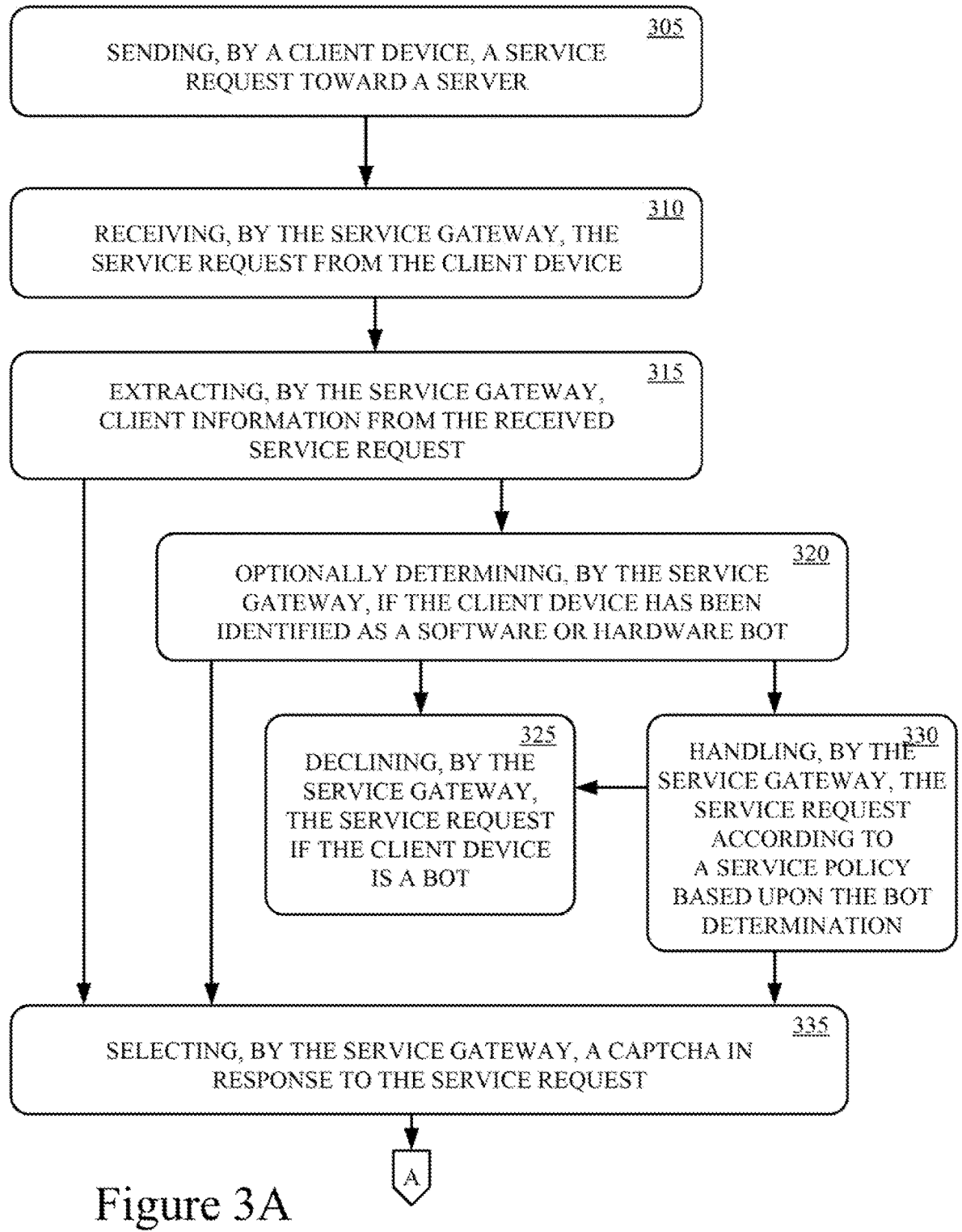
FIGS. 3A-3C show a method of controlling access to resources and services in a computing environment, in accordance with one embodiment of the present technology.
Figure 3B:
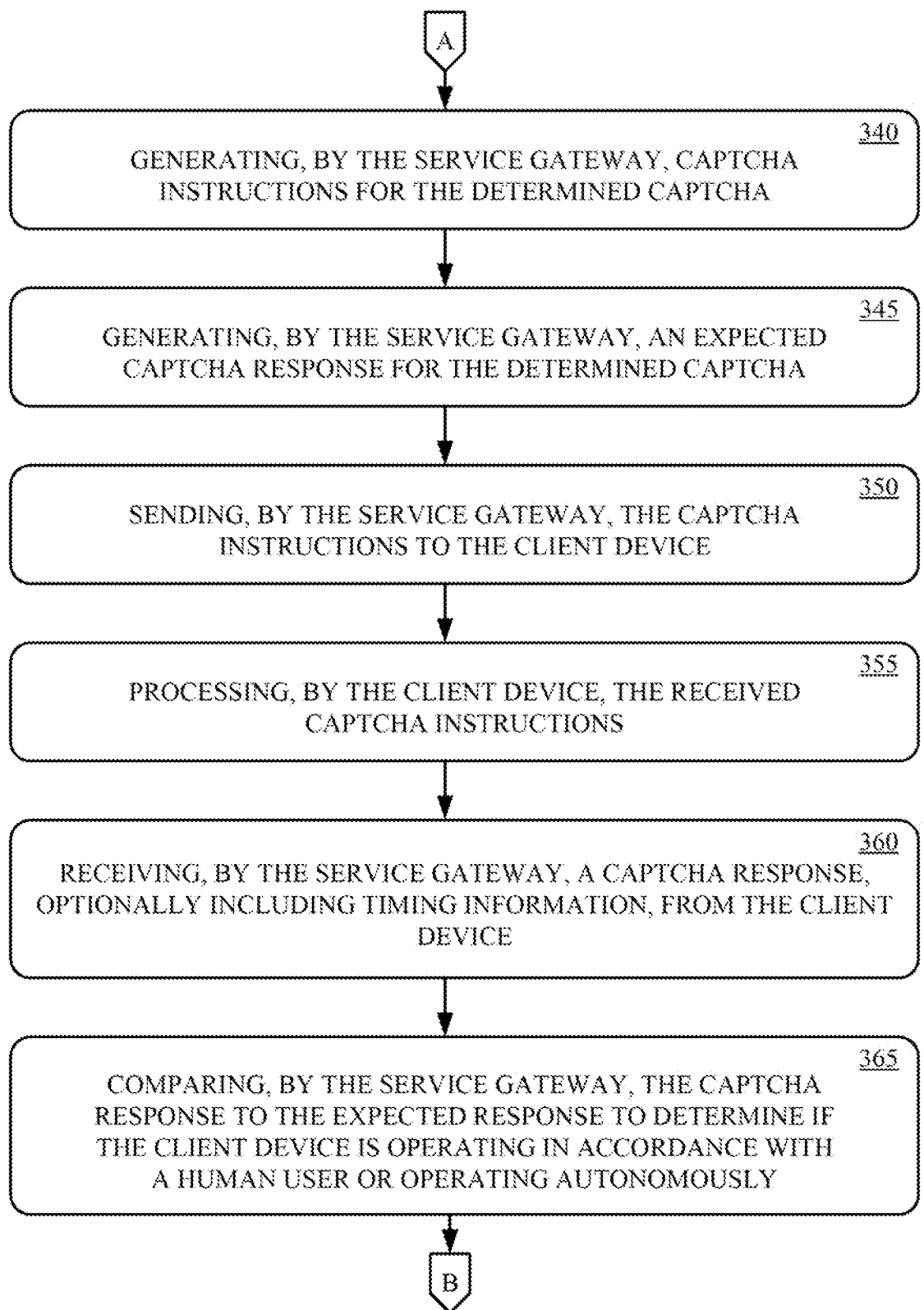
Figure 3C:
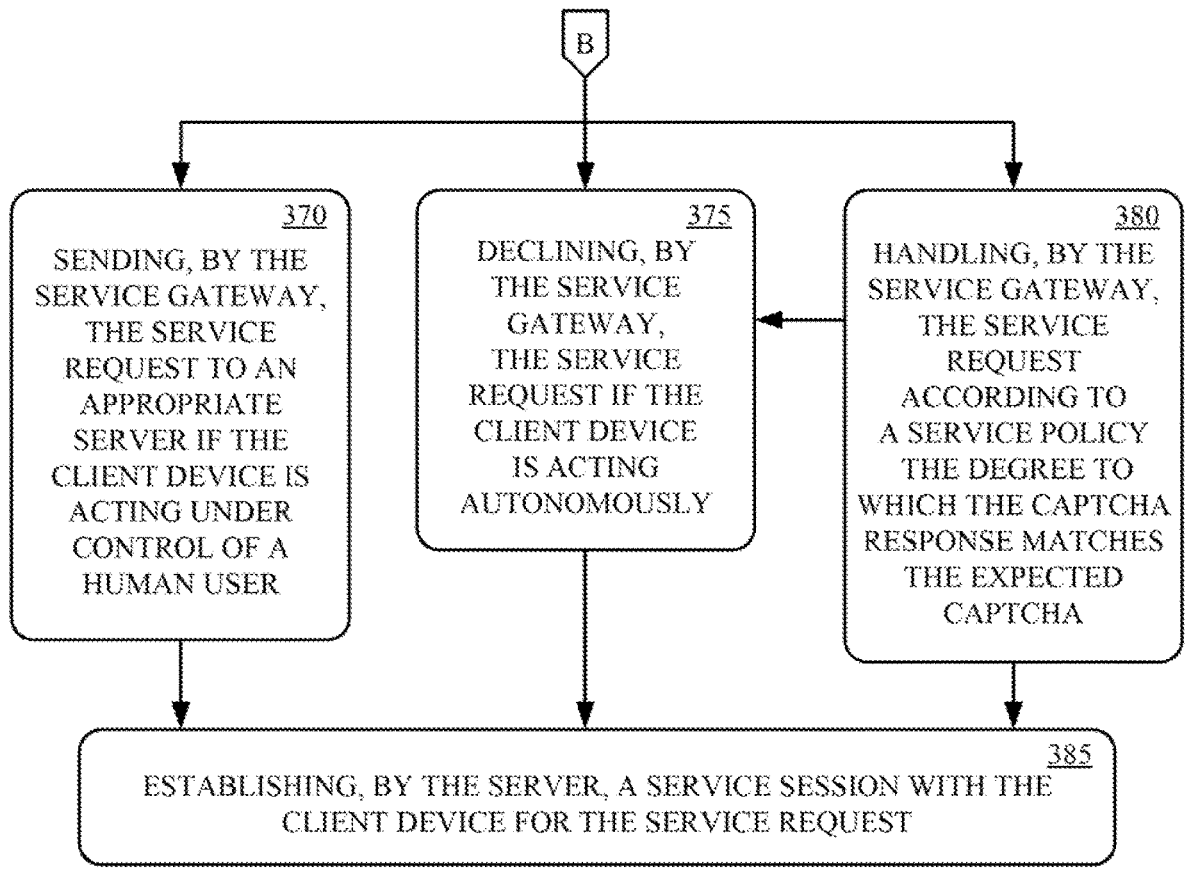

Operation of the service gateway will be further explained with reference to FIGS. 3A-3C, which show a method of controlling access to resources and services in a computing environment, in accordance with one embodiment of the present technology. The method may be implemented as one or more sets of computing device-executable instructions (e.g., computer program) that are stored in one or more computing device-readable media (e.g., computer memory) and executed by one or more computing devices (e.g., processor).

The method begins with a given client device sending a service request toward a server, at 305. The client device may send the service request in response to operation thereof by a human user. However, in some instances the client device may autonomously send the service request. The autonomous service request may be, for example, the result of an application running on the computing device such as a search engine, web crawler, malware, virus, internet bot or the like software robot. The autonomous service request may also be generated by the client device acting under control of another computing, device such as a machine-to-machine (B2B or M2M), zombie computer or the like.

At 310, the service gateway receives the service request from the given client device. The service request may be for a resource information, services) from a server device. The service request may include a web page request, an HTTP request, a file transfer request, a FTP session request, a voice over IP session request, a SIP session request, a voice session request, a video or audio streaming request, an email session, request, an online naming session request, an enterprise application session request, a teleconference session request, an advertisement request, a location based service request, a web-based communication session request, or the like.

At 315, the service gateway extracts client information from the received web service request. The client information may include information about the user, such as user identity user profile information and/or the like. The client information may also include information about the client device, such as one or mote network addresses of the client device, client device software information, and/or the like. The software information may include software vendor identity, software application identity, version browser identity, browser version, software application programming interface (API) information, or the like. The service information may include session information, session data, HTTP cookies, URL or the like. The location information may include location of client device, location of user, location of a network access point or network gateway connected to client device or the like. The request information may include web page being requested, document being requested, service requested, URL, or the like.

In response to receiving the service request, the service gateway may optionally determine if the client device has been identified as a known computing bot, at 20. As used herein, a computing bot is generally a computing device acting under software, hardware, and/or frank are control by the given device and/or another computing device without contemporaneous input form a human user. The service gateway may connect to one or more bot databases that includes information to allow the service gateway to determine if client device is acting under automated control. The bot database may include information of known Internet bots, search engines, web crawler, telemetry software, or any other automated machine to machine software. The bot databases may include one or more public or private bot registries, denial of service (DNS) records, or the like. The service gateway may match client information determined from the service request to information in the bot database to determine that the client device is under automated, control by a computing device. The bot database may be included in a storage module of the service gateway or another computing device. The bot database may distinguish between good and bad bots. Furthermore, the bot database may be updated based upon a bot usage behavior learning system.

If the service gateway determines that the client device has been identified as a bot, the service gateway may decline the service request from the client device, at 325. The service gateway may decline the service request by blocking the service request or not forwarding the servicer request on to the particular server device. The service gateway may, alternatively or in addition, send an error or a denial response to the client device.

The service gateway may additionally consult a service policy to determine if the service request is to be declined or if processing of the service request in accordance with the following procedures is performed at 330. The service policy may be stored in a service policy database in the service gateway or on another computing device. Based upon the service policy, the service gateway may for example continue to process the service request if, based upon the service policy, the client device is determined to be a "good" bot, represents a relatively low threat level, or the like. However, it the client device is determined to be a "bad" bot, the service policy may specify that the service request be blocked from further processing, modified before further processing, or the like.

If the bot database is not employed, the service gateway selects a captcha in response to receiving the service request, at 335. The service gateway may also select captcha, at 335, if the service gateway does not match information from the service request to information in a bot database, or the service policy specifies that processing of the service request should continue.

The service gateway may select captcha data and difficulty of the captcha from a captcha database. The captcha may be selected from the captcha database based upon client information determined from the service request. The captcha may, in addition or alternatively, be selected from the captcha database based on a client profile. The captcha may, in addition or alternatively, be selected from the captcha database based on a service policy.

The service policy may include a web application firewall (WAF) policy. The service policy may also include a captcha selection criterion based on one or more of a web page URL, a requested URL, a portion of requested URL, a cookie value, a user, a time such as time of day, a duration, a date, a session cookie value, a geographic location, a source network, a client network address, a service address, client device information such as device type, device capability or any security policy requiring confirmation of a human user. The service policy may include a captcha difficulty criterion to indicate a difficulty to the captcha to be solved by a human user of client device. The captcha difficulty may be a value from 1 to 10 from "easy" to "hard" to "very hard" or a time value from 1 second to 10 second indicating an expected time for a human user to respond to the captcha. The service policy may include a captcha selection criteria, such as a string, a collection of words, an image, a key word, a cantata category, which is associated to a captcha in the captcha database.

At 340 the service gateway retrieves, generates or specifies captcha data and generates captcha instructions for the selected captcha. The captcha data for the selected captcha may, for example be retrieved from the captcha database for inclusion with the generated captcha instructions. The captain data may, in the alternative, be generated by the service gateway for the selected captcha. The captcha data may, also in the alternative, be specified by the service gateway utilizing a link, address or the like of a location of where the captcha data can be retrieved. The captcha data may be a distorted image of a string of alpha numeric characters, an abstraction of a pattern, a picture, a sound sample, or the like.

The captcha instructions include computing device executable commands for outputting the captcha data on one or more user input/output interfaces of the client device. The captcha instructions may also include commands to prompt a user of client device to respond to the captcha. The captcha instructions may also include commands to obtain a response to the captcha. In addition, time duration of a response to the captcha on the client device may be determined in accordance with the captcha instructions. The time information may include time stamps of inputs of the user such as typing keys on a keyboard, moving a mouse or a pointing device, touching a touchscreen display, or the like. The Lime information may include time duration of an input, duration between two inputs, or the like. The service gateway may generate the captcha instructions using a web language such as AJAX, HTML5 or the like.

At 345, the service gateway generates an expected captcha response based on the selected captcha. The expected response may be an undistorted version of alpha numeric characters of the captcha, a complete pattern, touches, gestures, a text string concerning the subject of an image, a text string concerning the content of the sound sample, or the like. The expected response may optionally include an expected time duration range for a response to the captcha instructions. The expected response may include other time information such as current time stamp obtained from a clock coupled to the service gateway, a time duration indicating when a response to captcha is to be received, or the like. The service gateway may adjust an expected captcha response time duration according to the client profile. The service gateway may, alternatively or in addition, adjust the expected captcha response time duration according to a captcha criteria. For example, if the captcha difficult and has not been used with a user of client device, service gateway may adjust the captcha response time duration higher by a predetermined factor, or by a predetermined value. If captcha has been used according to the client profile, service gateway adjusts captcha response time duration lower indicating a user of client device is able to respond sooner.

At 350, the service gateway sends the captcha instructions to the client device. The service gateway may record a timestamp indicating when the captcha instructions were sent to the client device. The service gateway may send the captcha instructions using a communication session different from the service request. The captcha instructions may use a web programming or script language such as Java, Javascript, ECMAScript, Visual Basic, or the like utilized by a web module of the client device. In one implementation, the service gateway includes the service request in the captcha instructions At 355, the client device processes the captcha instructions received from the service gateway. The client device typically presents the captcha data on one or more user input/output interfaces in accordance with the received captcha instructions. The client device may receive a captcha response from a user on ogre or more user input/output interfaces of the client device in response to the presented captcha. However, the client device may alternatively generate a captcha response autonomously in hardware, software or firmware, without input from a human user. The client device may also receive a captcha response from another computing device. The client device captures the captcha response. In addition, the client device may also capture timing information associated with the captcha response.

The timing information associated with a captcha response from a user may be characterized by the type and difficulty of the captcha. Likewise, the characteristics of the user input/output interface may have an impact on the timing associated with a captcha response. For example, the layout of a keyboard typically results in a pattern of time delays between keystrokes. Furthermore a qwerty keyboard typically results in a different timing pattern compared to a standard keyboard. Likewise, the time capture of gestures on a touch screen may differ from those by a camera. In addition, timing associated with the captcha response from a user may also by characterized by the particular user and/or characteristics of the user input/output interface. For example, the cognitive pattern recognition of the particular user will affect the timing (e.g., delay between output of captcha and start of captcha response) associated with the captcha response. Likewise, if the user input/output interface is a keyboard, the timing between keystrokes may be dependent upon whether the user types will all ten fingers or predominately types with two fingers. Similarly, the timing characteristics of the captcha response may be impacted by the eye-hand coordination of the particular user. Therefore, the sequence of inputs comprising a captcha response received from a human user will typically be characterized by a predictable time delay component and a random delay component that ma be a function of the user input/output interlace and/or the particular human user. In contrast, a captcha response received by, hardware, firmware, or software executing on the client device or from another computing device will typically have a set pattern of time delays. Furthermore, the delay between the presentation of the captcha and the start of the captcha response may be far shorter than from a human user because computing devices typically process information far faster than human users enter data on a user input/output interface. Alternatively, the delay between the presentation of the captcha and the start of the captcha response may be far longer than from a human user because the difficult of the pattern recognition of the captcha may require substantial processing b the computing device, while a human user can perform the pattern recognition with relatively little effort.

The captcha response may be time-stamped. For example, the client device, in accordance with the captcha instructions, may collect a time stamp when the captcha is displayed on the display of the client device, a time stamp when a user begins entering a response to the captcha and a time stamp when the user finishes entering, the response. In another example, the client device may collect a time stamp of each individual input. For example, if the captcha response is word "penny" typed on a keyboard, the client device may collect a time stamp of 15:15:37.42 corresponding, to when the captcha was output on the display, 15:15.41 A2 corresponding to an entry of "p", 15.15:41:56 for "e", 15:15:42.22 for "n", 15:15:42.30 for a second "n", 15:15:42.50 for "y" and 15:15:43.20 corresponding to a "return/enter" keystroke indicating completion of the captcha response. The client device may calculate one or more timing events, such as a time duration, time differences and/or the like, based upon the collected time stamps. The client device ma store time stamps in the captcha response.

At 360, the service gateway receives the captcha response from the client device. The captcha response may be one or more alpha numeric characters received on a keyboard of the device, a gesture received on a touch screen or mouse of the device, or the like. The received captcha response may also include time information associated with the captcha response that was captured by the client device. Furthermore, the service gateway may record a timestamp associated with the receipt of the captcha response by the service gateway. The captcha response may also include the service request that was included in the captcha instructions.

At 365, the service gateway compares the captcha response to the expected response to determine if the client device is operating under control of a human user or operating autonomously. In one implementation, if the captcha response matches the expected response, it is determined that the client device is operating in accordance with a human user, if the captcha response does not match the expected response, it is determined that the client device is operating autonomously.

In another implementation, if the captcha response matches the expected response and the time information associated with the captcha response is within a predetermined range, it is determined that the client device is operation in accordance with a human user. If the captcha response does not match and/or the time information associated with the captcha response is outside (e.g., greater than or less than) a predetermined range, it is determined that the client device is operating autonomously. In one embodiment, the duration between when the captcha image was sent by the service gateway or displayed by the client device and the captcha response was received by the client device or the service gateway may be compared to a duration range calculated by the service gateway. If the duration is longer or shorter than a predetermined time duration, the captcha response time information suggests the client device is acting autonomously to solve the captcha.

In another implementation, the service gateway may determine a degree of how well the captcha response matches the expected response and calculate a risk or a score based thereupon. The service gateway may further determine the score or risk based upon time information associate with the captcha response. For example, if the time-stamped response matches the expected response within the predetermined range, the score is calculated to be high. If the time-stamped response is outside the predetermined range and/or the captcha response only partially matches the expected captcha response, the score is calculated to be low. The calculated risk or score may be adjusted (increased or decreased) based upon the service policy and/or the client profile. In addition or in the alternative, the calculated risk or score may be used to adjust the user profile and/or the service policy.

The service gateway may also determine if another captcha session is necessary. For example, if a calculated risk is in a given range, the service gateway may execute the processes at 335-365 to re-calculate a risk assessment of the service request from the client device. In such case, the new session may generate a new captcha with an updated difficulty based on the risk. However, if the calculated risk is low enough, or the score is high enough, there may be no need to execute a new captcha session, and instead the process continues as described below based upon the calculated risk or score. Similar, the process may continue at 375, described below, if the risk is high enough, or the score is low enough.

If the service gateway determines that the client device is operating in accordance with a human user access, the service gateway sends the service request to an appropriate server, at 370. Likewise, if a calculated risk or score is within a predetermined range, the service gateway may send the service request to an appropriate server. The service request may be sent to the appropriate server based upon a service policy and the determination that the client device is operating in accordance with a human user.

If the service gateway determine that the client device is operating autonomously, the service gateway may decline the service request, at 375. Likewise, if a calculated risk or score is outside the predetermined range, the service gateway may decline the service request. The service gateway may decline the service request by blocking the service request or not forwarding the servicer request on to the particular server device. The service gateway may, alternatively or in addition, send an error or a denial response to the client device.

Alternatively, the service gateway may apply a service policy for further processing the service request, based upon the degree to which the captcha response matched the expected region, at 380. Similarly, the service gateway may apply a service policy for further processing the service request, based upon the calculated risk or score.

In one implementation, the service gateway may examine a service policy to determine how to process the service request. Likewise, the service gateway may consider the score when applying a policy in processing the service request. For example, the service gateway may select a given server based on the score or modify the service request prior to sending the service request to the given server.

In addition, the service gateway may send an event log concerning the determination whether or not the client device is operating in accordance with a human user access to a network computing device. The service gateway may, alternative or in addition, store an event entry in client information concerning the determination whether or not the client device is operating in accordance with a human user access to a network computing device.

Upon receiving the service request from the service gateway, the server establishes a service session with the client device, at 385. Thereafter the client device and server device may perform various processes related to the service request.

Embodiments of the present technology advantageously implement integrated bot detection and captcha techniques. Embodiments of the present technology also advantageously implement diem profile and service policy based captcha techniques. Embodiment of the present invention may utilized timing information concerning the captcha response to improve the captcha techniques. Embodiment of the present technology advantageously also implement risk or score based captcha assessment techniques. The techniques advantageously improve the performance of computing systems by providing for improved computer bot detection and determination of whether computing resources are being accesses in accordance with human user based inputs or autonomous computing device access techniques.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated, it is intended that the scope of the invention be defined by the claims appended hereto and their equivalents.

What is claimed is:

1. A method comprising:
receiving a service request from a client device;
extracting client information from the received service request;
sending the service request to an appropriate server device; and
performing a CAPTCHA process based on the client information, including comparing a received CAPTCHA response to an expected CAPTCHA-response to determine a score associated with the client device acting in accordance with human user access and handling the service request based upon the score, wherein performing the CAPTCHA process is based upon a service policy, including examining the service policy to determine how to handle the service request, wherein performing the CAPTCHA process includes considering the score when applying the service policy, wherein performing the CAPTCHA process includes selecting a given server as the appropriate server device based upon the score and modifying the service request based upon the score prior to sending the service request to the given server, wherein performing the CAPTCHA process includes sending the service request to a server device if the client device is operating under control of a human user, and declining the service request to a server device if the client device is operating autonomously.

2. The method according to claim 1, wherein performing the CAPTCHA process includes selecting the CAPTCHA based upon the client information and wherein selection of a feature of the CAPTCHA is based upon the client information.

3. The method according to claim 2, wherein a feature of the CAPTCHA is:
a difficulty level associated with the CAPTCHA,
a timing consideration associated with the CAPTCHA, or
based upon if the CAPTCHA has been used with a user of the client device previously.

4. The method according to claim 1, wherein the CAPTCHA process includes:
obtaining a selected CAPTCHA and corresponding instructions in response to the service request;
sending the CAPTCHA and CAPTCHA instructions to the client device;
receiving a response from the client device; and
handling the service request based upon the response.

5. The method according to claim 4, wherein obtaining the selected CAPTCHA includes retrieving the CAPTCHA from a storage location.

6. The method according to claim 5, wherein the storage location is in a CAPTCHA database.

7. The method according to claim 4, wherein obtaining the selected CAPTCHA includes generating a CAPTCHA.

8. The method according to claim 4, wherein obtaining the selected CAPTCHA includes specifying a CAPTCHA.

9. The method according to claim 8, wherein specifying a CAPTCHA includes an indication of the location where the CAPTCHA can be accessed.

10. The method according to claim 1, wherein performing the CAPTCHA process includes determining if the client device is autonomously operated based upon the client information and a database.

11. The method according to claim 1, wherein performing the CAPTCHA process includes declining the service request to a server device if the client device is a bad or unauthorized bot.

12. The method according to claim 1, wherein performing the CAPTCHA process includes sending the service request to a server device if the client device is a good or authorized bot.

13. The method according to claim 1, wherein the CAPTCHA process includes determining if the client device has been identified as a bot based upon the client information and a bot database.

14. The method according to claim 1, wherein performing the CAPTCHA process includes:
generating an expected response;
receiving the response; and
comparing the response to the expected response to determine if the client device is operating under control of a human user.

15. The method according to claim 14, wherein generating an expected CAPTCHA response is based upon the client information.

16. A computing device for executing computing device executable instructions stored in a computing storage module that when executed by a processor of the computing device perform an access control process comprising:
receiving a service request from a client device;
extracting client information from the received service request;
determining if the client device has been identified as autonomously operated based upon the client information and a database; and
performing a CAPTCHA process based upon the client information and results of determining if the client device has been identified as autonomously operated, including comparing a received CAPTCHA response to an expected CAPTCHA response to determine a score associated with the client device acting in with accordance human user access and handling the service request based upon the score, wherein performing the CAPTCHA process is based upon a service policy, including examining the service policy to determine how to handle the service request, wherein performing the CAPTCHA process includes considering the score when applying the service policy, wherein performing the CAPTCHA process includes selecting a given server as the appropriate server device based upon the score and modifying the service request based upon the score prior to sending the service request to the given server, wherein performing the CAPTCHA process includes sending the service request to a server device if the client device is operating under control of a human user, and declining the service request to a server device if the client device is operating autonomously.

17. A computing device of claim 16, wherein performing the CAPTCHA process includes: forwarding the service request if the client device is determined to be a good bot, and declining the service request if the client device is determined to be a bad bot.

* * * * *